United States Patent
Cocchi et al.

(10) Patent No.: US 10,561,158 B2
(45) Date of Patent: Feb. 18, 2020

(54) MACHINE FOR MAKING AND DISPENSING LIQUID OR SEMI-LIQUID PRODUCTS

(71) Applicant: ALI GROUP S.r.l.—CARPIGIANI, Cernusco Sul Naviglio (IT)

(72) Inventors: Andrea Cocchi, Calderara di Reno (IT); Roberto Lazzarini, Reggio Emilia (IT)

(73) Assignee: ALI GROUP S.R.L.—CARPIGIANI, Cernusco Sul Naviglio (IT)

( * ) Notice: Subject to any disclaimer, the term of this patent is extended or adjusted under 35 U.S.C. 154(b) by 0 days.

(21) Appl. No.: 15/879,103

(22) Filed: Jan. 24, 2018

(65) Prior Publication Data
US 2018/0220674 A1 Aug. 9, 2018

(30) Foreign Application Priority Data
Feb. 9, 2017 (IT) .................. 102017000014495

(51) Int. Cl.
*A23G 9/12* (2006.01)
*A23G 9/04* (2006.01)
(Continued)

(52) U.S. Cl.
CPC .............. *A23G 9/12* (2013.01); *A23G 9/045* (2013.01); *A23G 9/08* (2013.01); *A23G 9/22* (2013.01);
(Continued)

(58) Field of Classification Search
CPC ... A23G 9/12; A23G 9/22; A23G 9/08; A23G 9/28; A23G 9/225; A23G 9/224; A23G 9/045

See application file for complete search history.

(56) References Cited

U.S. PATENT DOCUMENTS 3,797,268 A 3/1974 Garavelli
3,989,492 A * 11/1976 Keyes .................... A23G 9/045
62/136
(Continued)

FOREIGN PATENT DOCUMENTS

CN 205093509 U 3/2016
EP 1378176 A2 1/2004
WO WO0125135 A1 4/2001

OTHER PUBLICATIONS

Italian Search Report dated Sep. 26, 2017 for counterpart Italian Application No. 102017000014495.

*Primary Examiner* — Ana M Vazquez
(74) *Attorney, Agent, or Firm* — Shuttleworth & Ingersoll, PLC; Timothy Klima

(57) ABSTRACT

A machine for making and dispensing liquid or semi-liquid products including, in combination: at least one batch freezing unit, including: a processing vessel, a stirrer mounted inside the processing vessel to mix the basic product and provided with scrapers acting on the inside walls of the processing vessel, and a dispenser adapted to allow the product to be drawn out of the processing vessel; a first refrigerated compartment adapted to house a plurality of vessels for containing basic products; at least a first door for closing the first refrigerated compartment; at least one pump connected in use to the processing vessel and connectable to one of the vessels for containing basic products in order to transfer the basic product from the vessel for containing basic products to the processing vessel.

7 Claims, 5 Drawing Sheets

(51) Int. Cl.
*A23G 9/08* (2006.01)
*A23G 9/28* (2006.01)
*A23G 9/22* (2006.01)

(52) U.S. Cl.
CPC ............. *A23G 9/224* (2013.01); *A23G 9/225* (2013.01); *A23G 9/28* (2013.01)

(56) References Cited

U.S. PATENT DOCUMENTS

| | | |
|---|---|---|
| 4,522,041 A | 6/1985 | Menzel |
| 6,705,106 B1 | 3/2004 | Cunha et al. |
| 6,745,593 B2 * | 6/2004 | Cocchi ..................... A23G 9/22 62/342 |
| 2009/0120306 A1 * | 5/2009 | DeCarlo ................. A23G 9/12 99/485 |
| 2015/0034668 A1 | 2/2015 | Minard et al. |

* cited by examiner

MACHINE FOR MAKING AND DISPENSING LIQUID OR SEMI-LIQUID PRODUCTS

This application claims priority to Italian Patent Application IT 102017000014495 filed Feb. 9, 2017, the entirety of which is incorporated by reference herein.

BACKGROUND OF THE INVENTION

This invention relates to a machine for making and dispensing liquid or semi-liquid products, in particular products of the (soft) ice cream type.

In the technical field in question, machines for making soft ice cream are known which comprise a batch freezing cylinder, adapted to make soft ice cream, and a device for transferring basic product into the cylinder.

These machines may comprise a deformable container, adapted to contain the basic product which is transferred into the batch freezing cylinder by means of the device for transferring the basic product.

A particularly strongly felt need in the trade is that for a solution which is particularly safe in terms of food hygiene and which is at once easy and practical to use.

SUMMARY OF THE INVENTION

The aim of this invention, therefore, is to meet the above mentioned need by providing a machine for dispensing liquid or semi-liquid products which is particularly safe in terms of food hygiene and which is at once easy and practical to use.

BRIEF DESCRIPTION OF THE DRAWINGS

The technical features of the invention, with reference to the above aims, are clearly described in the claims below and its advantages are apparent from the detailed description which follows, with reference to the accompanying drawings which illustrate a preferred, non-limiting example embodiment of the invention, and in which:

DESCRIPTION OF THE PREFERRED EMBODIMENTS

With reference to the accompanying drawings, the numeral 1 denotes a machine for making and dispensing liquid or semi-liquid food products according to this invention.

Preferably, the machine 1 is designed to make and dispense ice cream type products, in particular products of the (preferably soft) ice cream type.

Figure 1:
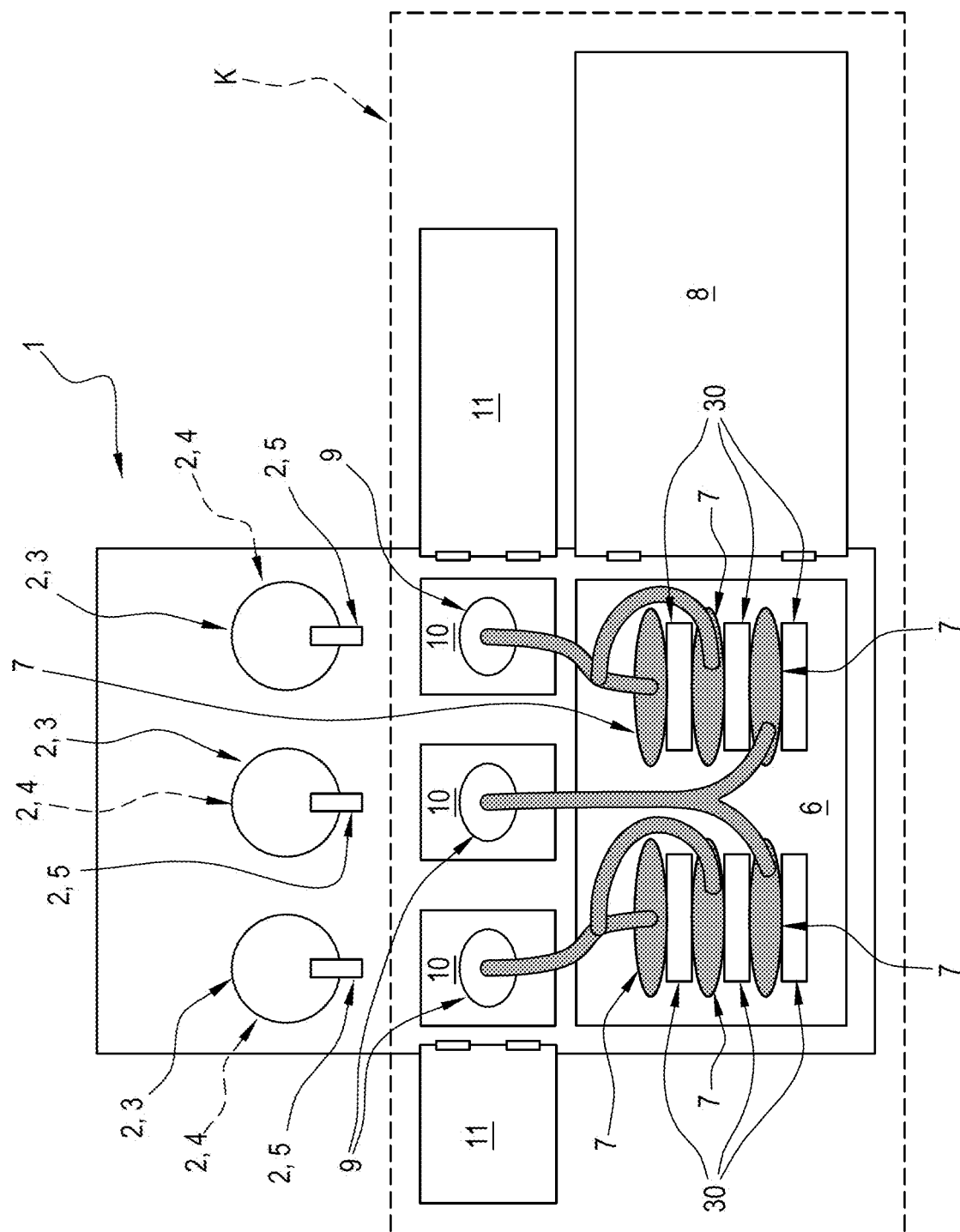
FIG. 1 is a schematic view of a machine forming the object of this invention, for making liquid or semi-liquid products.
Figure 2:
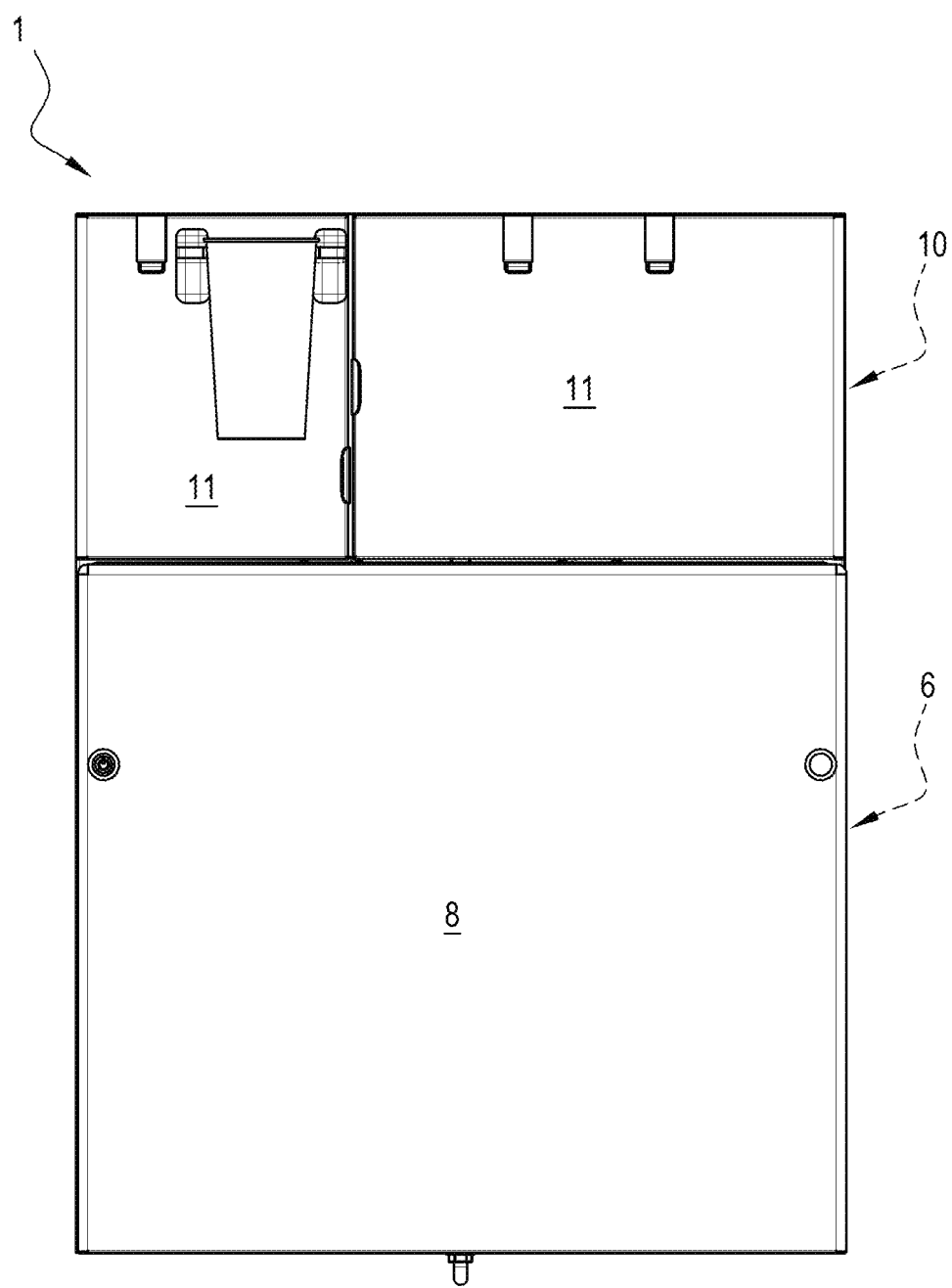
FIG. 2 is a perspective view of an embodiment of a detail of a machine forming the object of this invention, for making liquid or semi-liquid products, in a first configuration.
Figure 3:
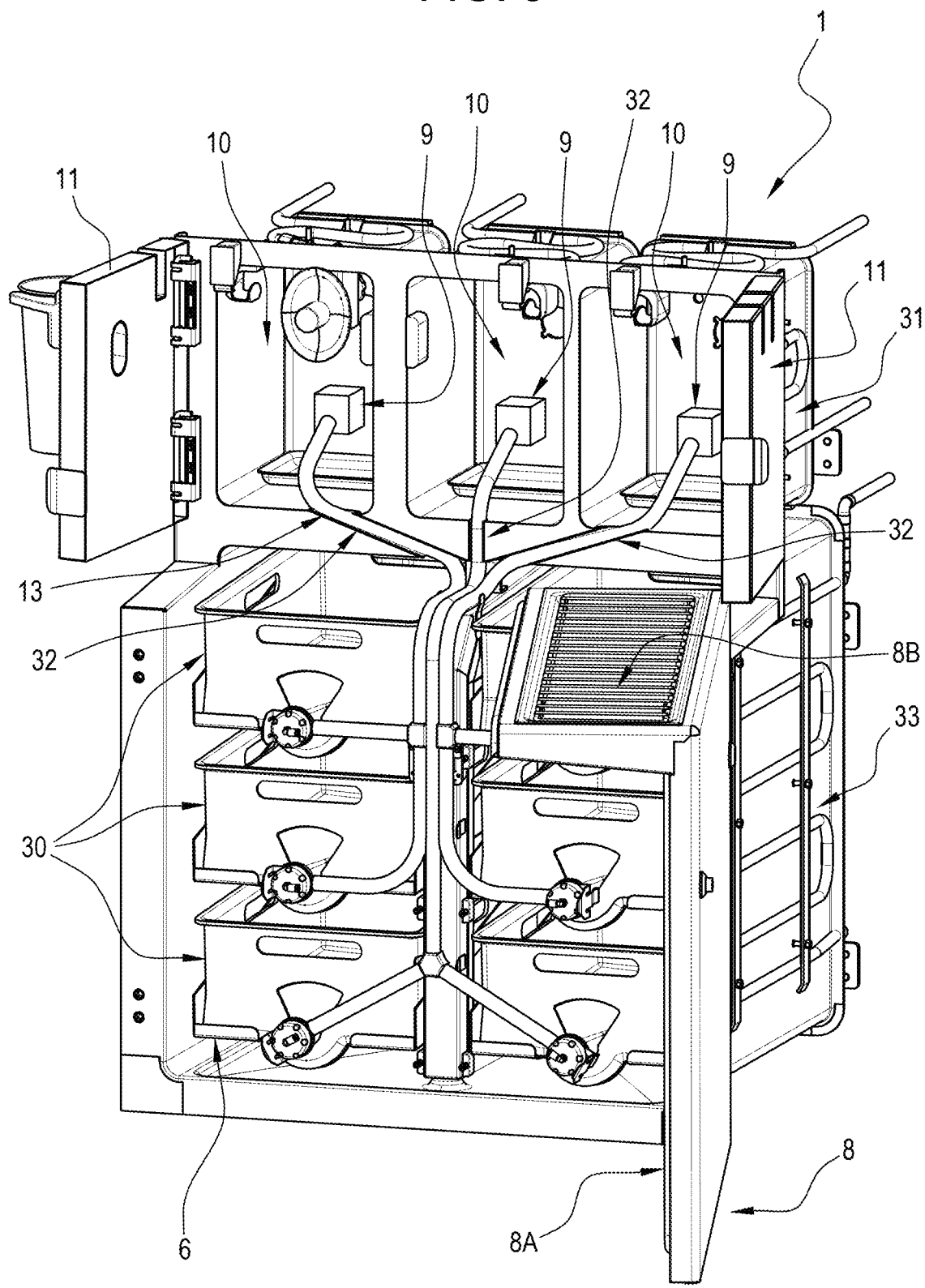
FIG. 3 is a perspective view of the detail of FIG. 2, forming the object of this invention, in a second configuration.
Figure 4:
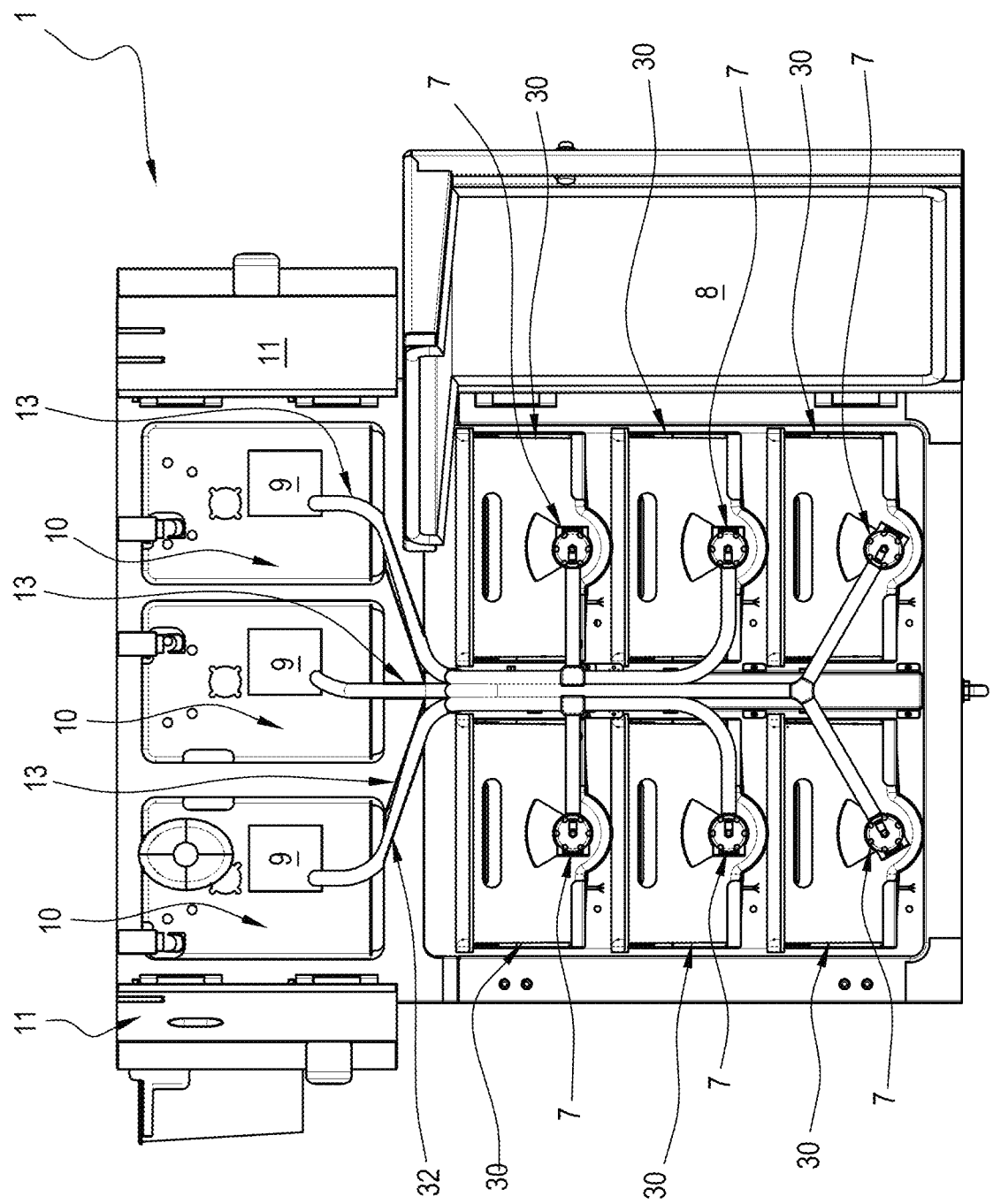
FIG. 4 is a front view of the detail of FIG. 2, forming the object of this invention, in a second configuration.
Figure 5:
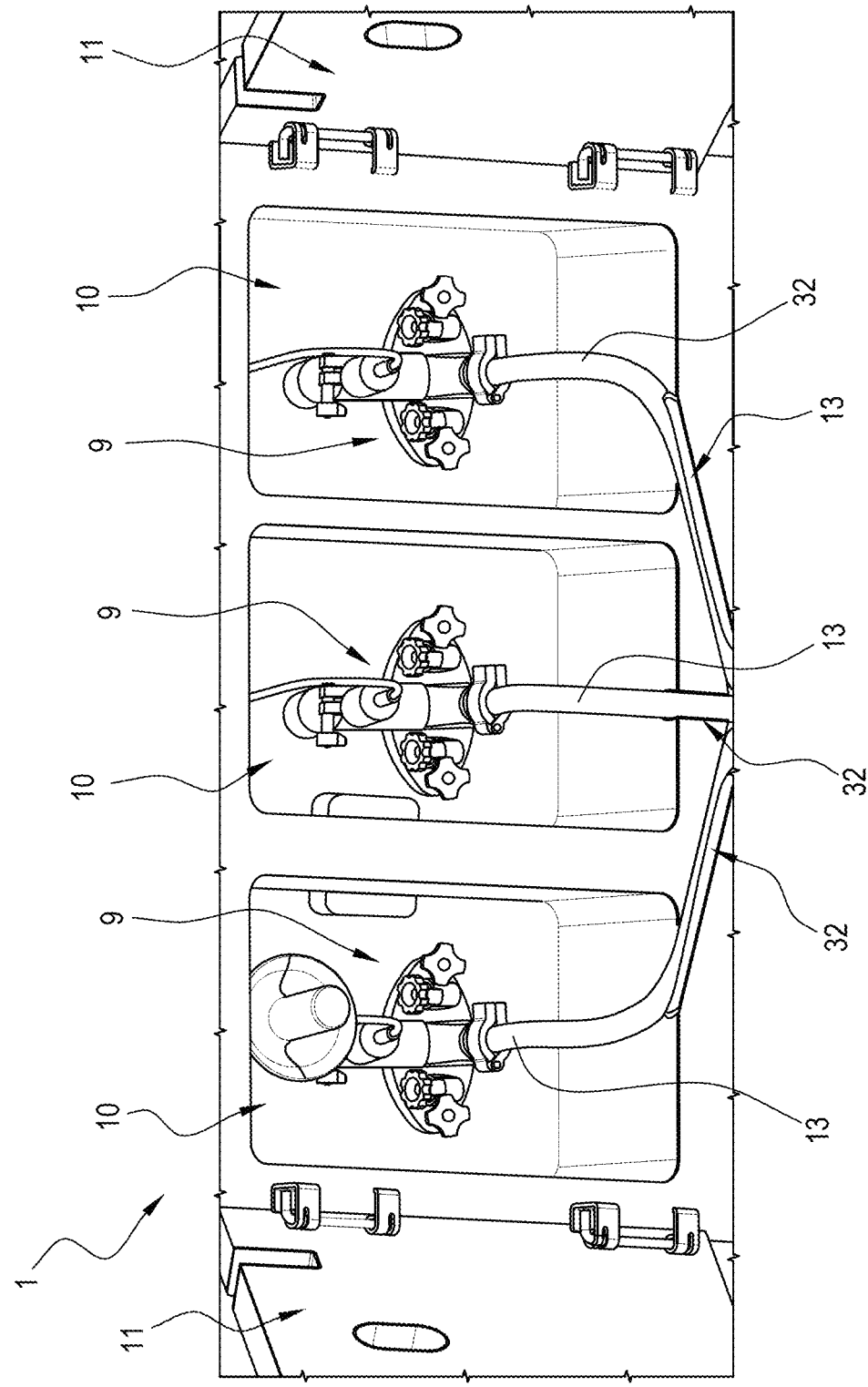
FIG. 5 shows a detail of the machine 1 of the preceding figures.

FIG. 1 is a schematic view showing the machine 1 in its entirety; FIGS. 2-4, on the other hand, show a detail, labeled K in FIG. 1, of the machine 1, while FIG. 5 shows another detail of the machine 1.

The machine 1 for making and dispensing liquid or semi-liquid products comprises, in combination:

at least one batch freezing unit 2, comprising: a processing vessel 3, a stirrer 4 mounted inside the processing vessel to mix the basic product and provided with scrapers acting on the (inside) walls of the processing vessel 3, and a dispenser 5 adapted to allow the product to be drawn out of the processing vessel 3;

a first refrigerated compartment 6 adapted to house at least one vessel 7 for containing basic products (and more preferably, a plurality of vessels 7 for containing basic products);

at least a first door 8 for closing the first refrigerated compartment 6;

at least one pump 9 connected in use to the processing vessel 3 and connectable to a vessel 7 for containing basic products in order to transfer the basic product from the vessel 7 for containing basic products to the processing vessel 3.

Preferably, the containment vessels 7 are deformable vessels (that is to say, their volume decreases as product is drawn out of them).

Preferably, the containment vessels 7 are vessels made of plastic material.

With reference to the batch freezing unit 2, attention is drawn to the following.

Preferably, the machine 1 comprises a refrigeration system (not illustrated), comprising a circuit in which a heat exchanger (refrigerant) fluid circulates.

The refrigeration system comprises a heat exchanger (evaporator), operatively associated with the processing vessel 3 (not illustrated).

Preferably, the heat exchanger (evaporator) allows cooling the basic product inside the processing container 3 to temperatures of between −5° C. and −20° C.

It should be noted that the refrigeration system preferably comprises a compressor and a further heat exchanger (evaporator).

The refrigeration system preferably further comprises a throttling device (for reducing the pressure of the refrigerant fluid).

With reference to the stirrer 4, it should be noted that the stirrer 4 is not illustrated in FIGS. 2 and 3.

The stirrer 4 comprises a shaft and a plurality of radial blades provided with scrapers operating on the cooled walls of the processing container 3.

The stirrer 4 is adapted to rotate, preferably about a (horizontal) axis.

The scrapers operate in a substantially continuous manner to remove ice from the cooled walls of the processing container 3.

According to another aspect, the machine 1 comprises at least a second compartment 10 adapted to house the pump 9 and a second door 11 for closing the second compartment 10.

In the embodiment illustrated in FIGS. 1-5, the machine 1 comprises three second compartments 10, each housing a pump 9.

Also as shown in the accompanying drawings, the machine 1 comprises a plurality of batch freezing units 2, specifically three batch freezing units 2.

It should be noted that the second door 11 may be used to close one or more second compartments 10: in FIG. 1, a first compartment 10 is closed by one door 11, while a second and a third compartment 10 are closed by another door 11.

Preferably, the second compartment 10 is refrigerated.

That way, the pumps 9 are advantageously kept at a controlled (low) temperature inside the second, refrigerated compartment 10 so that bacteria is substantially prevented from proliferating.

According to this aspect, the machine 1, comprises a heat exchanger 31 associated with at least one wall (preferably the side wall) of the second compartment 10 to allow it to be refrigerated.

Preferably, the heat exchanger 31 is operatively associated with (connected to) the refrigeration system of the machine 1.

Preferably, the heat exchanger 31 is a thermodynamic heat exchanger.

According to another aspect, the machine 1 comprises an opening 32 connecting the first and the second compartment (6, 10) to each other.

Preferably, the opening 32 is in the form of a seat which allows connecting the first and second compartments (6, 10).

The machine 1 further comprises at least one connecting duct 13 between the pump 9 and the containment vessel 7.

Preferably, the duct 13 passes through the connecting opening or seat 32 between the first and the second compartment (6, 10).

According to another aspect, the machine 1, comprises a heat exchanger 33 associated with at least one wall (preferably the side wall) of the first compartment 6 to allow it to be refrigerated.

Preferably, the heat exchanger 33 is operatively associated with (connected to) the refrigeration system of the machine 1.

Preferably, the heat exchanger 33 is a thermodynamic heat exchanger.

According to yet another aspect, the first door 8 for closing the first refrigerated compartment 6 comprises a vertical portion 8A and a horizontal portion 8B (as illustrated in FIG. 3), movable (as one) to allow access to the first refrigerated compartment 6.

The first refrigerated compartment 6 has the shape of a box.

The first door 8 isolates from the outside atmosphere the first refrigerated compartment 6 housing the vessels 7 which contain the basic products (allowing them to be kept at a low temperature).

It should be noted that in FIGS. 3 and 4, the pumps 9 are illustrated schematically as blocks), whereas they are well and clearly illustrated in FIG. 5.

The pumps 9 are preferably peristaltic pumps.

It should be noted that the first compartment 6 is equipped with at least one support 30 adapted to support a vessel 7 which contains basic products.

Preferably, the first compartment 6 is provided with a plurality of supports 30 adapted to house vessels 7 which contain basic products.

Preferably, as illustrated in FIGS. 3 and 4, the supports 30 preferably consist of drawers into which the vessels 7 containing the basic products are placed.

The drawers 30 are preferably movable relative to the frame of the machine 1.

With reference in particular to the ducts 13, it should be noted that each pump 9 is connected by ducts 13 to two vessels 7 containing basic products.

More precisely, the inlet of each pump 9 is connected by ducts 13 to at least one vessel 7 containing basic products.

Further, the outlet of each pump 9 is connected to one of the processing vessels 3.

In use, the pump 9 transfers the basic product from the vessels 7 containing the basic products to the processing vessels 3.

The ducts 13 are preferably equipped with valves: opening or closing one or more of these valves enables a pump 9 to be placed selectively in contact with a vessel 7 or with another of these vessels.

Thus, when the contents of one of the vessels 7 are finished, it is possible to switch to the other vessel 7 without interrupting the operation of the machine 1.

What is claimed is:

1. A machine for making and dispensing liquid or semi-liquid products, comprising:
    a batch freezing unit, comprising: a processing vessel, a stirrer mounted inside the processing vessel to mix a basic product and including scrapers acting on an inside wall of the processing vessel, and a dispenser configured to allow liquid or semi-liquid product to be drawn out of the processing vessel;
    a refrigerated first compartment configured to house a containment vessel for containing the basic product;
    a first door for closing the first compartment;
    a first heat exchanger positioned on or adjacent a wall of the first compartment to refrigerate the first compartment;
    a pump connected in use to the processing vessel and connectable to the containment vessel to transfer the basic product from the containment vessel to the processing vessel;
    a refrigerated second compartment configured to house the pump;
    a second door for closing the second compartment;
    a second heat exchanger positioned on or adjacent a wall of the second compartment to refrigerate the second compartment;
    a connecting opening between the first compartment and the second compartment, and further comprising a connecting duct between the pump and the containment vessel.

2. The machine according to claim 1, wherein a portion of the connecting duct, in use, passes through the connecting opening.

3. The machine according to claim 1, wherein the first door for closing the first refrigerated compartment comprises a vertical portion and a horizontal portion, both movable to allow access to the first compartment.

4. The machine according to claim 1, and further comprising a support mounted inside the first compartment to support the containment vessel.

5. The machine according to claim 4, wherein the support is a drawer which is movable relative to a frame of the machine.

6. The machine according to claim 1, wherein the pump is a peristaltic pump.

7. The machine according to claim 1, wherein:
    the first heat exchanger is positioned on or adjacent the wall of the first compartment to refrigerate the first compartment through the wall of the first compartment; and
    the second heat exchanger is positioned on or adjacent the wall of the second compartment to refrigerate the second compartment through the wall of the second compartment.

* * * * *